United States Patent
Radich et al.

(10) Patent No.: US 9,985,807 B1
(45) Date of Patent: May 29, 2018

(54) CHANNEL PARAMETER RECOVERY

(71) Applicant: Seagate Technology LLC, Cupertino, CA (US)

(72) Inventors: William Michael Radich, Longmont, CO (US); Rishi Ahuja, Broomfield, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/194,802

(22) Filed: Jun. 28, 2016

(51) Int. Cl.
  *H03H 7/40* (2006.01)
  *H04L 25/03* (2006.01)

(52) U.S. Cl.
  CPC .............. *H04L 25/03891* (2013.01)

(58) Field of Classification Search
  CPC ......... H04L 25/03178; H04L 25/03885; H04L 25/03949; H04L 27/01; H04L 27/38; H04L 7/0058; H04L 25/03019; H04L 2025/03681; H04L 25/03292; H04L 2025/03611; H04L 2027/0038; H04B 10/6971; H03H 21/0012
  USPC ....... 375/232, 233, 229, 350, 230, 348, 234, 375/346, 316, 341, 262–263; 455/307, 455/138, 296, 306, 63.1; 370/290, 292, 370/503; 714/746, 795, 764, 794; 333/18, 28 R
  See application file for complete search history.

(56) References Cited

U.S. PATENT DOCUMENTS

| | | | | |
|---|---|---|---|---|
| 5,285,474 A | * | 2/1994 | Chow | H04L 27/2647 375/222 |
| 5,577,068 A | * | 11/1996 | Bottomley | H04B 7/005 375/232 |
| 5,905,659 A | * | 5/1999 | Rose | G05B 13/042 375/232 |
| 6,625,208 B2 | | 9/2003 | Hindie | |
| 8,175,201 B2 | | 5/2012 | Mathew | |
| 2002/0047745 A1 | * | 4/2002 | Kolanek | H03F 1/0294 330/149 |
| 2002/0172297 A1 | * | 11/2002 | Ouchi | H04L 27/2647 375/316 |
| 2004/0059986 A1 | * | 3/2004 | Aida | G11B 20/10009 714/764 |
| 2008/0151987 A1 | * | 6/2008 | Maruyama | H04L 25/03038 375/232 |
| 2009/0122931 A1 | * | 5/2009 | Hoshuyama | H03H 17/0294 375/350 |

(Continued)

*Primary Examiner* — Khanh C Tran
(74) *Attorney, Agent, or Firm* — Cesari & Reed, LLP; Kirk A. Cesari; Logan Brown (57) ABSTRACT

A system may comprise a finite impulse response circuit configured to receive one or more samples of a first signal and generate an equalized signal based on the plurality of samples of the input signal and one or more updatable tap coefficients. The system may include an adaptation circuit configured to update the one or more updatable tap coefficients based on the plurality of samples of the input signal. The system may further comprise a recovery circuit configured to accumulate one or more retuning values based on the plurality of samples of the input signal and, in response to an error condition, generate one or more retuned tap coefficients for the finite impulse response circuit based on the one or more retuning values and replace the one or more updatable parameters with the one or more retuned parameters.

20 Claims, 6 Drawing Sheets

(56) References Cited

U.S. PATENT DOCUMENTS

| | | | |
|---|---|---|---|
| 2009/0161245 A1* | 6/2009 | Mathew | G11B 20/10046 360/65 |
| 2010/0287420 A1* | 11/2010 | Mathew | G11B 5/09 714/48 |
| 2011/0093517 A1* | 4/2011 | Liu | G11B 5/035 708/207 |
| 2012/0308029 A1* | 12/2012 | Christoph | H03H 17/0229 381/71.12 |

* cited by examiner

CHANNEL PARAMETER RECOVERY

SUMMARY

In certain embodiments, an apparatus may comprise a circuit configured to receive a plurality of samples of an input signal. The circuit may generate an output signal based on the plurality of samples of the input signal and one or more updatable parameters. Further, the circuit may update the one or more updatable parameters based on the plurality of samples of the input signal and accumulate retuning values based on the plurality of samples of the input signal. Also, the circuit may, in response to an error condition, generate one or more retuned parameters based on the retuning values and replace the one or more updatable parameters with the one or more retuned parameters.

In certain embodiments, a system may comprise a finite impulse response circuit configured to receive one or more samples of a first signal and generate an equalized signal based on the plurality of samples of the input signal and one or more updatable tap coefficients. The system may include an adaptation circuit configured to update the one or more updatable tap coefficients based on the plurality of samples of the input signal. The system may further comprise a recovery circuit configured to accumulate one or more retuning values based on the plurality of samples of the input signal and, in response to an error condition, generate one or more retuned tap coefficients for the finite impulse response circuit based on the one or more retuning values and replace the one or more updatable parameters with the one or more retuned parameters.

In certain embodiments, a method may comprise receiving a plurality of samples of an input signal. The method may comprise generating an output signal based on the plurality of samples of the input signal and one or more updatable parameters. The method may further comprise accumulating one or more retuning values based on the plurality of samples of the input signal on a sample-by-sample basis and, in response to an error condition, generating retuned parameters based on the one or more retuning values and replacing the one or more updatable parameters with the one or more retuned parameters.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure generally relates to the recovery of channel parameters, and in some embodiments, the present disclosure relates to retuning of channel parameters in response to an error condition. Some systems, such as electrical, electronic, motor drive, processing, or other systems may receive a signal of interest and process that system based on channel parameters. During operation, the system may adapt the channel parameters. In some cases, an error condition may occur, for example, with regard to the channel parameters.

For example, an error condition may occur if the adaptation of the channel parameters fails to converge. For example, an error condition may result from can be an offtrack read in a hard disk drive, where the initial seek places the read head relatively far from the center of the track. In that case, the pre-loaded equalization of the read channel may be non-optimal and result in the parameters not converging. When such an error occurs, a recovery procedure may be triggered. The recovery procedure may generate retuned parameters as replacements for the adaptive parameters that failed to converge.

In some embodiments, a set of relevant sample statistics or retuning values may be accumulated on a sample by sample basis during the operation of the channel. Upon the occurrence of an error condition (e.g., the failure of the channel parameters to converge within some period or number of samples), the accumulated sample statistics or retuning values may be utilized to generate retuned parameters as replacements for the adaptive parameters that failed to converge.

While the above discussion utilized read channel parameters as examples, the disclosed error recovery techniques and systems may apply to other circuits or parameters. For example, similar operations may be performed for the parameters of an detector which could similarly be rendered non-optimal by an offtrack read in a hard disk drive, where the initial seek places the read head relatively far from the center of the track. Many other variations would be apparent to one of ordinary skill in the art in view of this disclosure.

Figure 1:
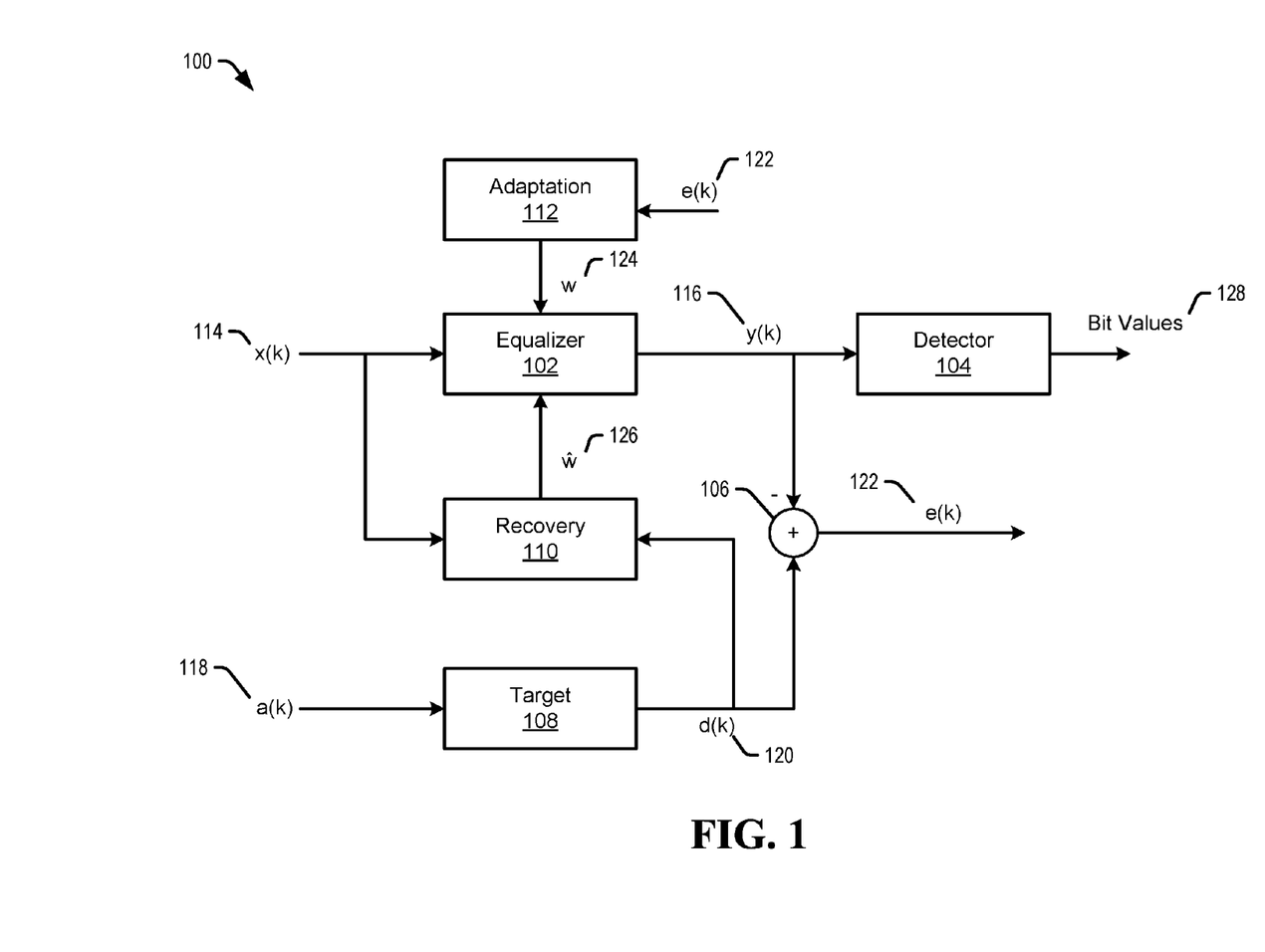
FIG. 1 is a block diagram of a system of channel parameter recovery, in accordance with certain embodiments of the present disclosure.

Referring to FIG. 1, a block diagram of a system of a channel parameter recovery is shown and is generally designated 100. The system 100 can be configured to perform an error recovery procedure to retune channel parameters based on a set of relevant sample statistics that may be accumulated on a sample by sample basis during the operation of the system 100. System 100 can include an equalizer 102 that may be coupled to a detector 104 and an adder 106, a target 108 that may be coupled to the adder 104 and a recovery 110, the recovery 110 that may be coupled to the equalizer 102, and an adaptation 112 that may be coupled to the equalizer 102. As discussed in detail below, in the embodiment illustrated in FIG. 1, the channel parameters that are recovered are the parameters of the equalizer 102.

The equalizer 102 may receive a signal of interest 114 ($x(k)$) which may be equalized. The equalizer 102 may generate an equalized signal 116 ($y(k)$) based on the signal 114.

The detector 104 may operate to determine the bit value(s) 128 represented by the samples of the bit sequence in the equalized signal 116.

The target 108 may receive a signal 118 ($a(k)$) which can be used to generate a target or 'desired' signal 120 ($d(k)$). In some embodiments, the signal 114 and signal 118 may be bit sequences. The signal 118 may be based on or derived from the signal of interest 114.

The adder 106 may receive the equalized signal 116 and the target signal 120. The adder 106 may combine the equalized signal 116 and the target signal 120 to generate an error signal 122 ($e(k)$) which may represent the difference between the equalized signal 116 and the target signal 120.

The adaptation 112 may receive the error signal 122 and update parameters 124 ($w$) of the equalizer 102 based on the error signal. For example, in an embodiment where the equalizer may be a finite impulse response (FIR) equalizer, the parameters 124 may be tap coefficients of the FIR.

The recovery 110 may receive the signal of interest 114 and the target signal 120 during the operation of the system 100. The recovery 110 may operate to accumulate a set of relevant sample statistics or retuning parameters based on the signal of interest 114 and the target signal 120. When an error condition occurs, the recovery 110 may utilize the accumulated sample statistics in an error recovery procedure to generate retuned parameters 126 ($\hat{w}$) for the equalizer 102. In the discussion herein, variables with hats (e.g., $\hat{w}$, $\hat{r}$, $\hat{p}$) may represent approximate or estimated values.

The retuned parameters 126 may be output to the equalizer 102 for use as replacements for the adaptive parameters 124. In some embodiments, the recovery 110 may accumulate the sample statistics on a sample by sample basis (e.g., as each sample of the signals 114 and 120 is received by the recovery 110). In other embodiments, the recovery 110 may collect the samples of signals 114 and 120 and generate the sample statistics once the error condition has occurred.

Each of the equalizer 102, detector 104, adder 106, target 108, recovery 110 and adaptation 112 may be a separate circuit, a system on chip (SOC), firmware, a processor(s), or other system not listed, or any combination thereof.

Figure 2:
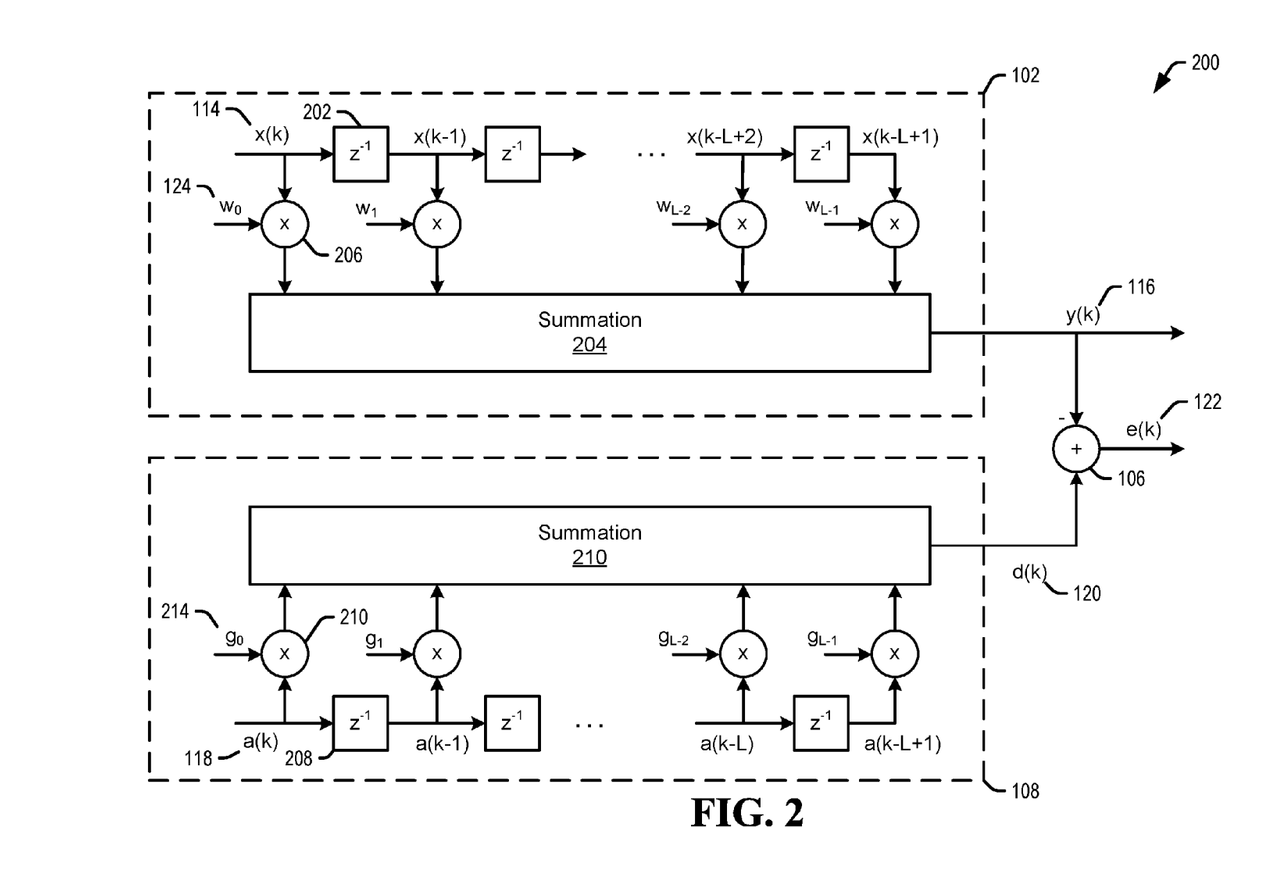
FIG. 2 is a block diagram of a system of channel parameter recovery, in accordance with certain embodiments of the present disclosure.
Figure 3:
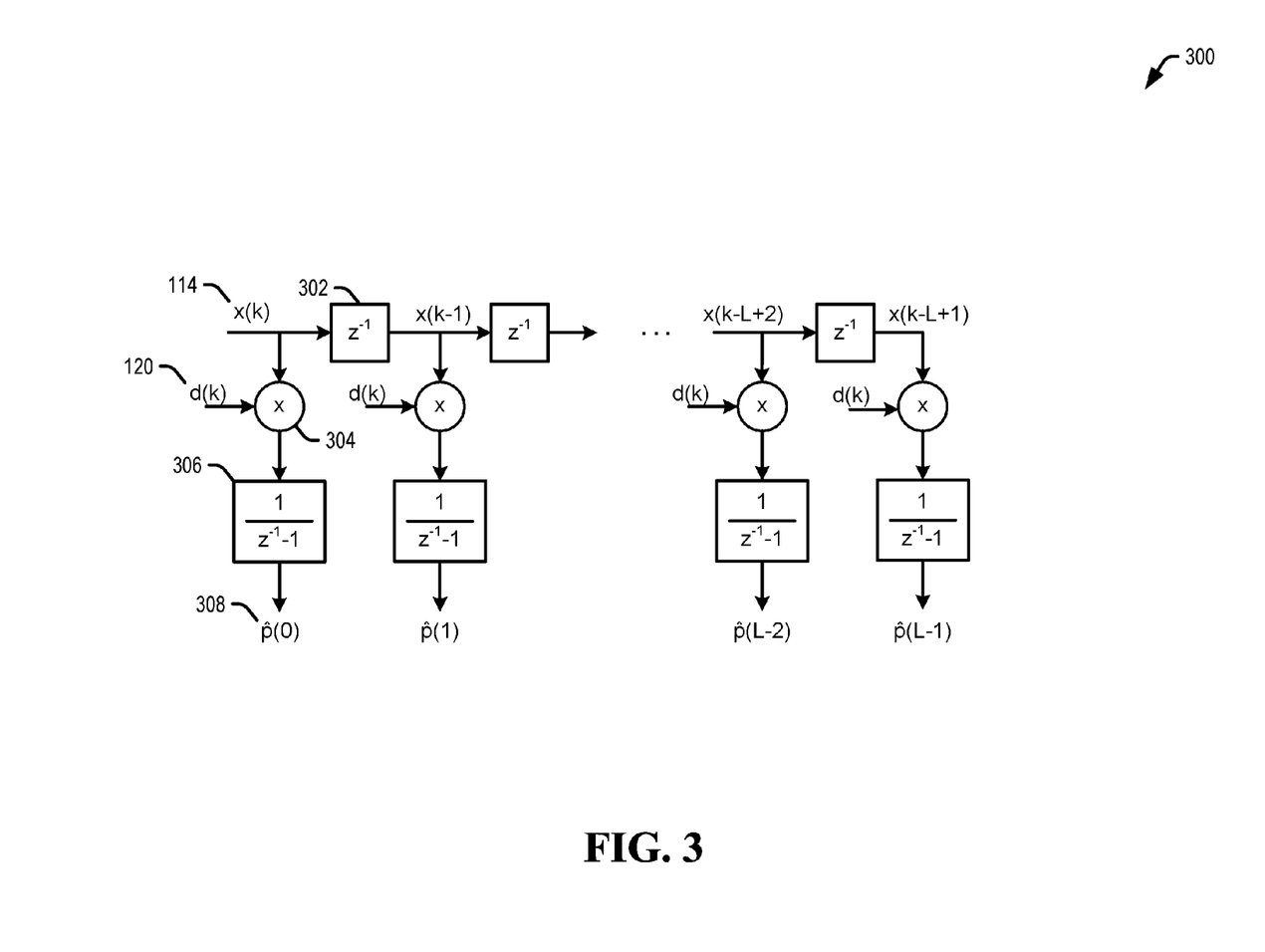
FIG. 3 is a block diagram of a system of channel parameter recovery, in accordance with certain embodiments of the present disclosure.
Figure 4:
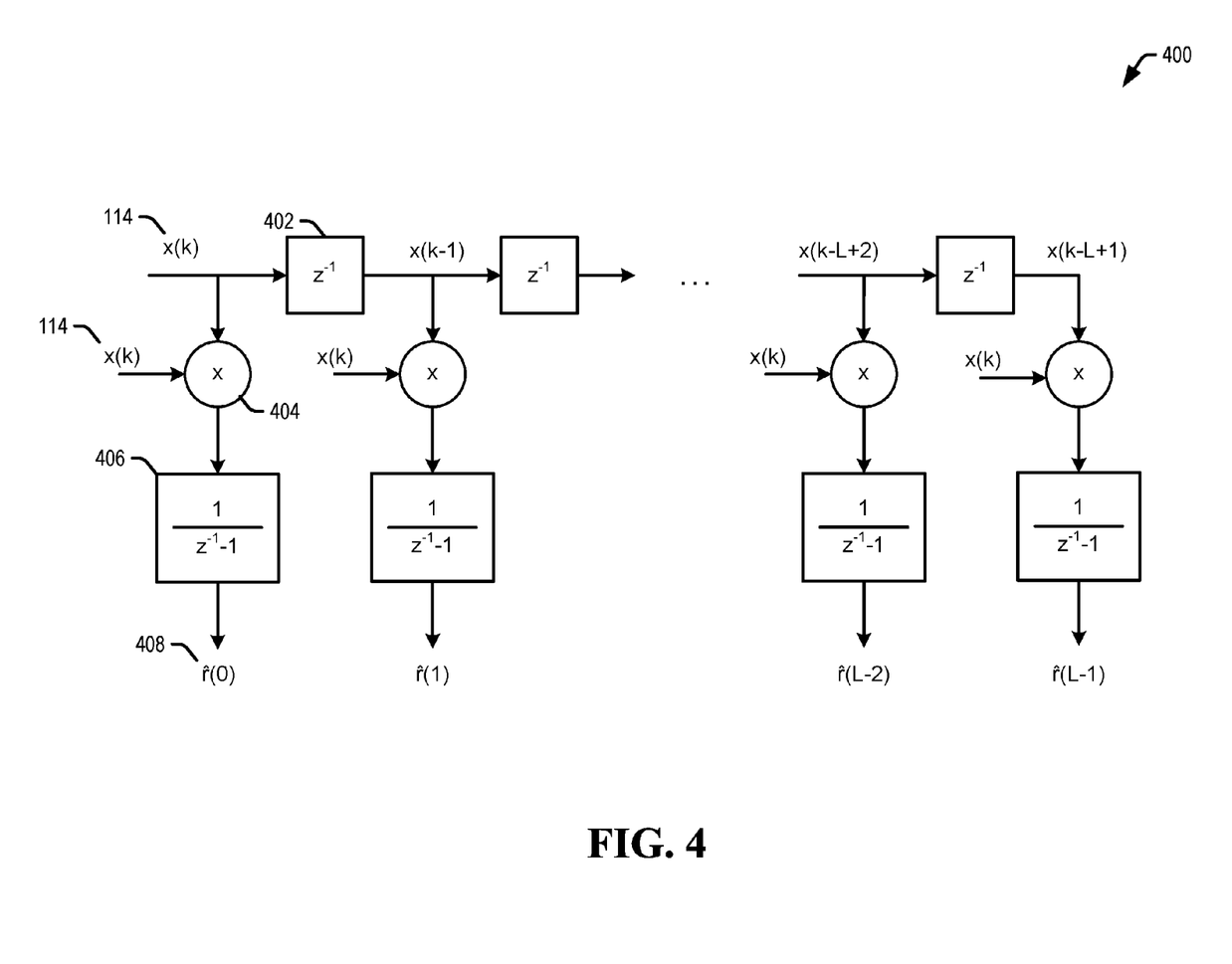
FIG. 4 is a block diagram of a system of channel parameter recovery, in accordance with certain embodiments of the present disclosure.

FIGS. 2-4 and the following discussion provide an example of the operation of the equalizer 102 and the recovery 110 in embodiments where the equalizer 102 is a finite impulse response (FIR) equalizer.

Referring to FIG. 2, a block diagram of a system of channel parameter recovery is shown and is generally designated 200. Generally, the operations of the equalizer 102, the adder 106 and the target 108 with respect to signals 114, 116, 118, 120, 122 and 124 may be the same as in FIG. 1. In FIG. 2, the architecture of the equalizer 102 and the target 108 is shown for embodiments in which the equalizer 102 is an FIR equalizer.

As illustrated, the equalizer 102 may include a series of delays 202, multipliers 204 and a summation 206 that collectively operate on the signal 114 using the tap coefficients 124 ($w$) to determine samples of the equalized signal 116 ($y(k)$) as:

$$y(k) = \sum_{l=0}^{L-1} x(k-l)w_l$$

where L is the number of taps of the equalizer 102.

Similarly, the target 108 may include a series of delays 208, multipliers 210 and a summation 212 that collectively operate on the signal 118 using the tap coefficients 214 ($g$) to determine samples of the target signal 120 ($d(k)$) as:

$$d(k) = \sum_{l=0}^{L-1} a(k-l)g_l$$

where L is the number of taps of the target 108.

As previously mentioned, the equalized signal 116 and target signal 120 may be utilized by the adder 106 to generate the error signal 122. For example, the error signal may be the difference between the equalized signal 116 and target signal 120. The error signal 122 may be used by the adaptation 112 to adapt the tap coefficients 124 on a sample by sample basis. A similar adaptation of the tap coefficients 214 ($g$) may also be conducted using the error signal 122. For example, the tap coefficients may be adapted using a least mean squares (LMS) algorithm. The LMS algorithm may be used to adapt to a minimum-mean-squared error criterion. However, implementations are not limited to using LMS and may instead include a variety of other adaptive algorithms, such as 'zero-forcing' equalization, that may adapt parameters to 'other' optimality criteria.

FIGS. 3 and 4 illustrate portions of the recovery 110 that operate to accumulate retuning values for use in generating retuned tap coefficients 126 for the equalizer 102 during an error recovery procedure.

Referring to FIG. 3, a block diagram of a system of channel parameter recovery is shown and is generally designated 300. In embodiments of system 300, the system 300 may generate retuning values for use as elements of a cross correlation vector ($\hat{p}$) in an error recovery procedure.

As illustrated, the system 300 may include a series of delays 302, multipliers 304 and accumulators 306 that collectively operate on the signals 114 and 120 to determine retuning values 308 ($\hat{p}$) for the cross correlation vector as:

$$\hat{p}(l) = \frac{1}{N} \sum_{k=0}^{N-1} x(k-l)d(k)$$

for l=0, . . . , L−1; where L is the number of taps of the equalizer 102. For example, the accumulators 306 may be all-pole or auto-regressive accumulators that may operate recursively.

Referring to FIG. 4, a block diagram of a system of channel parameter recovery is shown and is generally designated 400. In embodiments of system 400, the system 400 may generate retuning values for use as elements of an autocorrelation matrix ($\hat{R}$) in an error recovery procedure.

As illustrated, the system 400 may include a series of delays 402, multipliers 404 and accumulators 406 that collectively operate on the signal 114 to determine retuning values 408 ($\hat{r}$) for the autocorrelation vector as:

$$\hat{r}(l) = \frac{1}{N}\sum_{k=0}^{N-1} x(k-l)x(k)$$

for l=0, ..., L–1; where L is the number of taps of the equalizer 102.

In operation, when an error condition occurs, such as a failure of the tap coefficients 124 ($w$) to converge, the retuning values 308 and 408 may be used as follows.

The retuning values 308 may be used to populate a vector $\hat{p}$ as follows:

$$\hat{p} = \begin{bmatrix} \hat{p}(0) \\ \hat{p}(1) \\ \vdots \\ \hat{p}(L-1) \end{bmatrix}$$

The retuning values 408 may be used to populate a Toeplitz matrix $\hat{R}$ as follows:

$$\hat{R} = \begin{bmatrix} \hat{r}(0) & \hat{r}(1) & \cdots & \hat{r}(L-1) \\ \hat{r}(1) & \hat{r}(0) & & \hat{r}(L-2) \\ \vdots & & \ddots & \vdots \\ \hat{r}(L-1) & \hat{r}(L-2) & \cdots & \hat{r}(0) \end{bmatrix}$$

The vector $\hat{p}$ and matrix $\hat{R}$ may then be used to determine the retuning parameters 126 ($\hat{w}$) as:

$$\hat{w} = \hat{R}^{-1}\hat{p}$$

Having determined the retuning parameters 126, the recovery 110 may output retuning parameters 126 to the equalizer 102 as replacements for the adaptive parameters 124.

Figure 5:
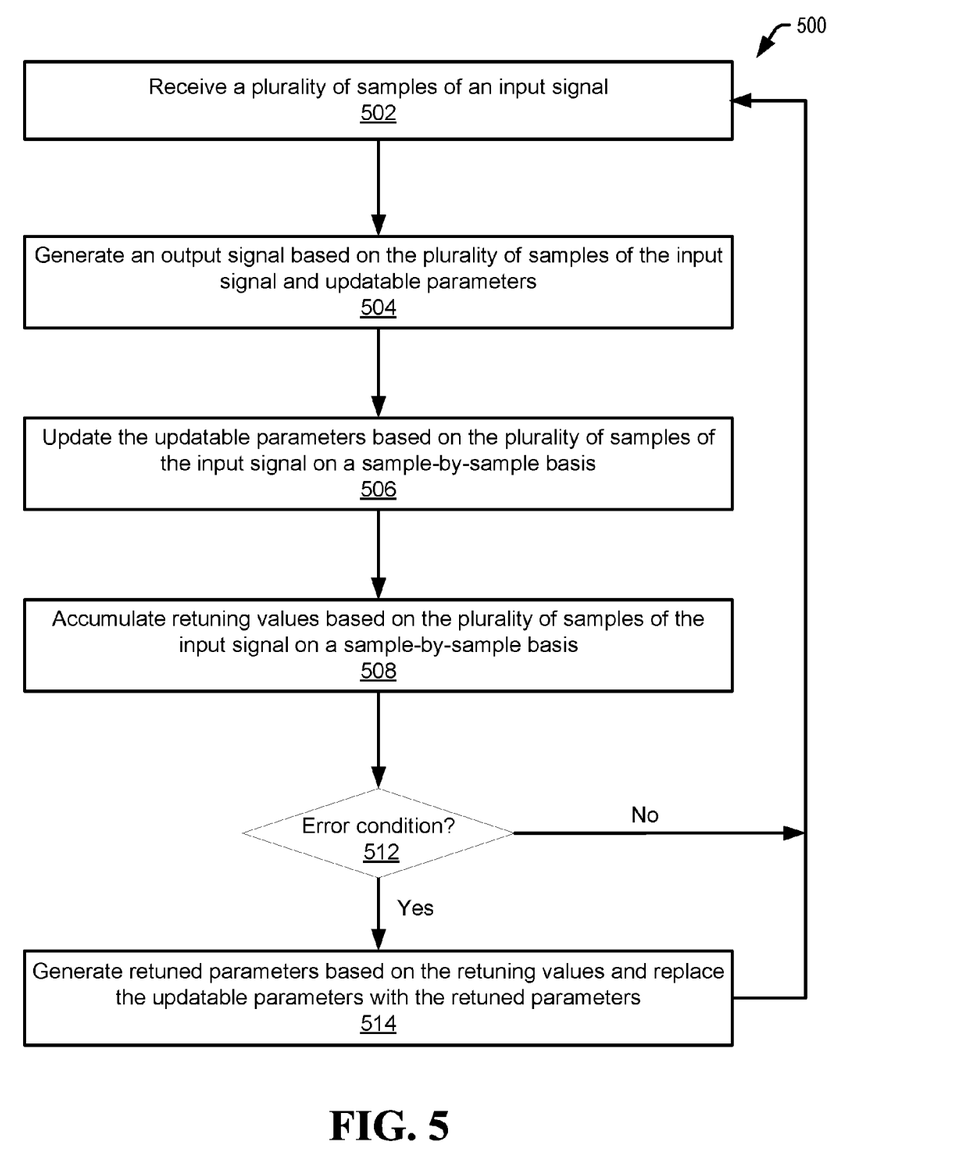
FIG. 5 is a flowchart of a method channel parameter recovery, in accordance with certain embodiments of the present disclosure.

Referring to FIG. 5, a flowchart of a method of channel parameter recovery is shown and is generally designated 500. The method 500 can be an embodiment of the systems 100, 200, 300 and 400.

The system may receive a plurality of samples of an input signal, at 502. The system may then generate an output signal based on the plurality of samples of the input signal and updatable parameters, at 504. At 506, the system may update the updatable parameters based on the plurality of samples of the input signal, for example, on a sample-by-sample basis. At 508, the system may operate to accumulate retuning values based on the plurality of samples of the input signal, for example, on a sample-by-sample basis.

The system may determine if an error condition has arisen at 512. If an error condition has not arisen, the system may return to 502. If an error condition has arisen, such as the failure of the updatable parameters to converge, the system may initiate an error recovery procedure and generate retuned parameters based on the retuning values and replace the updatable parameters with the retuned parameters. After the recovery procedure, the system may continue at 502.

All steps listed for the method may 500 be applied to systems that have parameters that may be determined based on collected samples or which have adaptive parameters. Many variations would be apparent in view of this disclosure. For example, another error-condition to which the above example techniques and systems may be applied is a failure of the error-control-code at the sector level (e.g., an LDPC) to converge. It should be noted that the retuning values can be continuously updated. If no error condition is detected, the retuning values can be ignored/not used. This and other variations would be apparent to one of ordinary skill in the art in view of this specification. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 6:
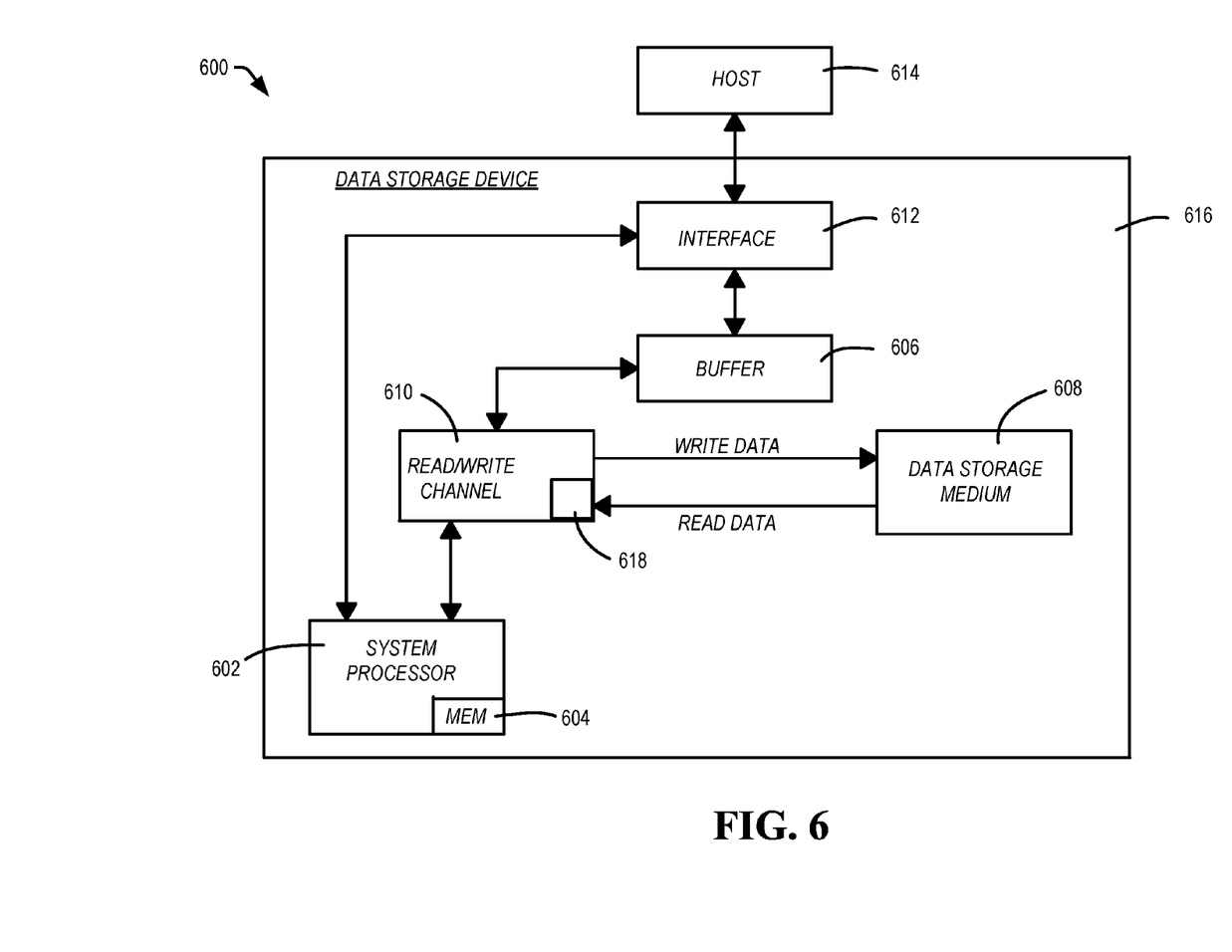
FIG. 6 is a block diagram of a system of channel parameter recovery, in accordance with certain embodiments of the present disclosure.

Referring to FIG. 6, a block diagram of a system of channel parameter recovery is shown and generally designated 600. The system 600 can be an example of a data storage device (DSD), and may be an example implementation of systems 100, 200, 300 or 400. The DSD 616 can optionally connect to and be removable from a host device 614, which can be a device or system having stored data, such as a desktop computer, a laptop computer, a server, a digital video recorder, a photocopier, a telephone, a music player, other electronic devices or systems not listed, or any combination thereof. The data storage device 616 can communicate with the host device 614 via the hardware/firmware based host interface circuit 612 that may include a connector (not shown) that allows the DSD 616 to be physically connected and disconnected from the host 614.

The DSD 616 can include a system processor 602, which may be a programmable controller, and associated memory 604. The system processor 602 may be part of a system on chip (SOC). A buffer 606 may temporarily store data during read and write operations and can include a command queue. The read/write (R/W) channel 610 can encode data during write operations to, and reconstruct data during read operations from, the data storage medium 608. The data storage medium 608 is shown and described as a hard disc drive, but may be other types of magnetic medium, such as a flash medium, optical medium, or other medium, or any combination thereof.

The R/W channel 610 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 610 can combine multiple inputs and provide a single output, as described in examples herein.

The block 618 can implement all of or part of the systems and functionality of systems 100, 200, 300 and 400. In some embodiments, the block 618 may be a separate circuit, integrated into the R/W channel 610, included in a system on chip, firmware, software, or any combination thereof.

Though the systems and methods are discussed herein in the context of an adaptive equalizer, the disclosed subject matter is not so limited. For example, the retuning value accumulation and recovery procedure disclosed herein may be applied to other adaptive circuits, such as a detector (e.g. a data dependent SOVA). More particularly, data-dependent noise-predictive (DDNP) detectors may incorporate datadependence in a detector branch metric. A branch metric may be a function that depends not only on the received value, typically after the FIR filter, but also on a 'hypothesized' data sequence that a trellis branch represents. In some embodiments, a trellis may be a representation of such a hypothesized data sequence, or 'state-transition' in a Viterbi detector. A DDNP branch metric may include a 'noise-whitening' FIR filter, as well as a 'mean' or 'bias' value. For example, in a 16-state detector, there may be 2×16=32 possible 'branches' or state transitions and, in turn, 32 possible DDNP branch metrics. Each branch metric may have a corresponding noise-whitening FIR filter and a corresponding bias value. The optimization of the noise-whitening FIR parameters for each branch may be performed in a similar fashion to that described above. As such, in example embodiments, retuning values may be accumulated for each noise whitening FIR of the DDNP detector during operation and those accumulated values may be used to retune the parameters of the noise whitening FIR in response to an error condition. Such a retuning operation may be performed in a similar fashion to that described above with regard to the read channel parameters.

In another example variation, although the above discussion of systems 100, 200, 300 and 400 refer to embodiments in which the retuning values may be generated on a sample by sample basis, in other embodiments, the system may perform the generation of the retuning values as part of the error recovery procedure. For example, the values of the signal 114 ($x(k)$) and the target signal 120 ($d(k)$) could be stored for use in the error recovery procedure.

Further, as another example variation, the set of eigenvectors and eigenvalues corresponding to the autocorrelation matrix R can be computed or accumulated as samples of the signal 114 are received or computed during the error recovery procedure. The average of multiple reads of the signal 114 (such as by multiple reads of a sector of interest) may be used to generate equalizer or detector parameters offline in error recovery, such as by using N-averaged samples x(k) of the signal 114 and the set of eigenvectors and eigenvalues.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   receive a plurality of samples of an input signal;
   generate an output signal based on the plurality of samples of the input signal and one or more updatable parameters;
   update the one or more updatable parameters based on the plurality of samples of the input signal;
   accumulate retuning values based on the plurality of samples of the input signal; and
   in response to an error condition, generate one or more retuned parameters based on the retuning values and replace the one or more updatable parameters with the one or more retuned parameters.

2. The apparatus of claim 1, the circuit further comprising an equalizer that operates to generate the output signal by equalizing the plurality of samples of the input signal, the output signal including a plurality of equalized samples.

3. The apparatus of claim 1, further comprising the circuit further configured to perform the update of the one or more updatable parameters on a sample-by-sample basis.

4. The apparatus of claim 1, further comprising the circuit further configured to generate a target signal based on the plurality of samples of the input signal and one or more target parameters, the circuit further configured to perform the accumulation of the one or more retuning values based on the target signal.

5. The apparatus of claim 1 further comprising the circuit further configured to:
   generate a target signal based on the plurality of samples of the input signal and one or more target parameters;
   generate an error signal based on the output signal and the target signal; and
   the update of the one or more updatable parameters being further based on error signal.

6. The apparatus of claim 1, further comprising the error condition being a failure of the one or more updatable parameters to converge within a sector of a hard disk corresponding to the plurality of samples of the input signal.

7. The apparatus of claim 1, further comprising the circuit further configured to perform the accumulation of the one or more retuning values on a sample-by-sample basis.

8. The apparatus of claim 1 further comprising the circuit configured to generate the one or more retuned parameters by using the one or more accumulated retuning values as elements of an autocorrelation matrix and a cross correlation vector.

9. The apparatus of claim 1 the circuit further comprising a detector that operates to generate the output signal as a plurality of bit values based on the plurality of samples of the input signal.

10. A system comprising:
   a finite impulse response circuit configured to receive one or more samples of a first signal and generate an equalized signal based on the plurality of samples of the input signal and one or more updatable tap coefficients;
   an adaptation circuit configured to update the one or more updatable tap coefficients based on the plurality of samples of the input signal;
   a recovery circuit configured to:
   accumulate one or more retuning values based on the plurality of samples of the input signal; and in response to an error condition, generate one or more retuned tap coefficients for the finite impulse response circuit based on the one or more retuning values and replace the one or more updatable parameters with the one or more retuned parameters.

11. The system of claim 10 further comprising the adaptation circuit configured to perform the update of the one or more updatable tap coefficients on a sample-by-sample basis.

12. The system of claim 11 further comprising:
a target circuit configured to generate a target signal based on the plurality of samples of the input signal and one or more target parameters; and
the recovery circuit further configured to perform the accumulation of the one or more retuning values based on the target signal.

13. The system of claim 12 further comprising:
a target circuit configured to generate a target signal based on the plurality of samples of the input signal and one or more target parameters,
an adder circuit configured to generate an error signal based on the equalized signal and the target signal; and
the adaptation circuit configured to perform the update of the one or more updatable tap coefficients based on error signal.

14. The system of claim 13 further comprising the error condition being a failure of the one or more updatable tap coefficients to converge within a sector of a hard disk corresponding to the plurality of samples of the input signal.

15. The system of claim 14 further comprising the adaptation circuit configured to perform the accumulation of the retuning values on a sample-by-sample basis.

16. The system of claim 13 further comprising the adaptation circuit configured to generate the one or more retuned parameters by using the one or more accumulated retuning values as elements of an autocorrelation matrix and a cross correlation vector.

17. A method comprising:
receiving a plurality of samples of an input signal;
generating an output signal based on the plurality of samples of the input signal and one or more updatable parameters;
updating the one or more updatable parameters based on the plurality of samples of the input signal on a sample-by-sample basis;
accumulating one or more retuning values based on the plurality of samples of the input signal on a sample-by-sample basis; and
in response to an error condition, generating one or more retuned parameters based on the one or more retuning values and replacing the one or more updatable parameters with the one or more retuned parameters.

18. The method of claim 17 further comprising:
generating a target signal based on the plurality of samples of the input signal and one or more target parameters, the accumulating of the one or more retuning values being further based on the target signal.

19. The method of claim 18 further comprising:
generating an error signal based on the output signal and the target signal, the updating of the one or more updateable parameters being further based on error signal, the error condition being a failure of the one or more updatable parameters to converge within a sector of a hard disk corresponding to the plurality of samples of the input signal;
receiving an additional sample of the input signal; and
generating an additional output signal based on the additional sample of the input signal and the one or more retuned parameters.

20. The method of claim 17 further comprising the generating of the one or more retuned parameters being performed by using the one or more accumulated retuning values as elements of an autocorrelation matrix and a cross correlation vector.

* * * * *